United States Patent [19]

Ogihara et al.

[11] Patent Number: 4,702,579

[45] Date of Patent: Oct. 27, 1987

[54] AUTOMATIC FILM SENSITIVITY CHANGE-OVER DEVICE

[75] Inventors: Masuo Ogihara; Hajime Oda; Yoichi Seki; Hiroshi Yamazaki, all of Shikawatashi, Japan

[73] Assignee: Seikosha Co., Ltd., Tokyo, Japan

[21] Appl. No.: 766,031

[22] Filed: Aug. 15, 1985

[30] Foreign Application Priority Data

Aug. 15, 1984 [JP] Japan ................... 59-170276

[51] Int. Cl.⁴ .............................. G03B 7/00
[52] U.S. Cl. ................................. 354/21
[58] Field of Search ............................ 354/21

[56] References Cited

U.S. PATENT DOCUMENTS

| 4,512,643 | 4/1985 | Tokuda ........................ 354/21 |
| 4,538,890 | 9/1985 | Ishizaka et al. ............... 354/21 |
| 4,579,433 | 4/1986 | Ishizaka et al. ............... 354/21 |
| 4,588,272 | 5/1986 | Hoda et al. .................... 354/21 |
| 4,598,985 | 7/1986 | Inoue ............................ 354/21 |
| 4,598,986 | 7/1986 | Shiratori et al. .............. 354/21 |

*Primary Examiner*—Russell E. Adams
*Attorney, Agent, or Firm*—Bruce L. Adams; Van C. Wilks

[57] ABSTRACT

A device which includes means for detecting a film sensitivity code based upon International Standardization Organization and provided on a film cartridge when the film cartridge is loaded, whereby it is determined whether or not a film is one whose cartridge has a code provided thereon by adding 1 to the film sensitivity code detected the means to detect if a carry-over appears or not.

11 Claims, 5 Drawing Figures

AUTOMATIC FILM SENSITIVITY CHANGE-OVER DEVICE

BACKGROUND OF THE INVENTION

1. Technical Field

This invention relates to a device for automatically changing over the film sensitivity of a camera body in accordance with the sensitivity of a photograph film loaded in a camera.

2. Prior Art

Films having various sensitivities have been put on the market due to the rapid advancements being made in photosensitive materials. Consequently, photograph films have been also put on the market which have a film sensitivity indication based upon the International Standardization Organization (ISO) and which may be read on a camera body to allow automation of setting of the film sensitivity on the camera body in order to prevent failure of a user in loading of a film.

However, on the other hand, a great number of conventional films from which the film sensitivity cannot be read are still on the market.

Accordingly, there exists a problem that a user who owns a camera on which setting of the film sensitivity is automated must confirm one by one if films to be loaded are those based upon ISO or not, thereby making the loading operation of films troublesome.

SUMMARY OF THE INVENTION

The present invention has been made in consideration of such a problem, and it is an object of the invention to provide an automatic film sensitivity change-over circuit which can automatically determine if reading of a film sensitivity is possible or not and thus can read, for a film for which automatic setting is possible, the film sensitivity to effect setting of the sensitivity. Construction The present invention is characterized in that 1 bit is added to a film sensitivity code based upon ISO to determine if a carry-over signal appears or not.

DETAILED DESCRIPTION OF PREFERRED EMBODIMENTS

Figure 1:
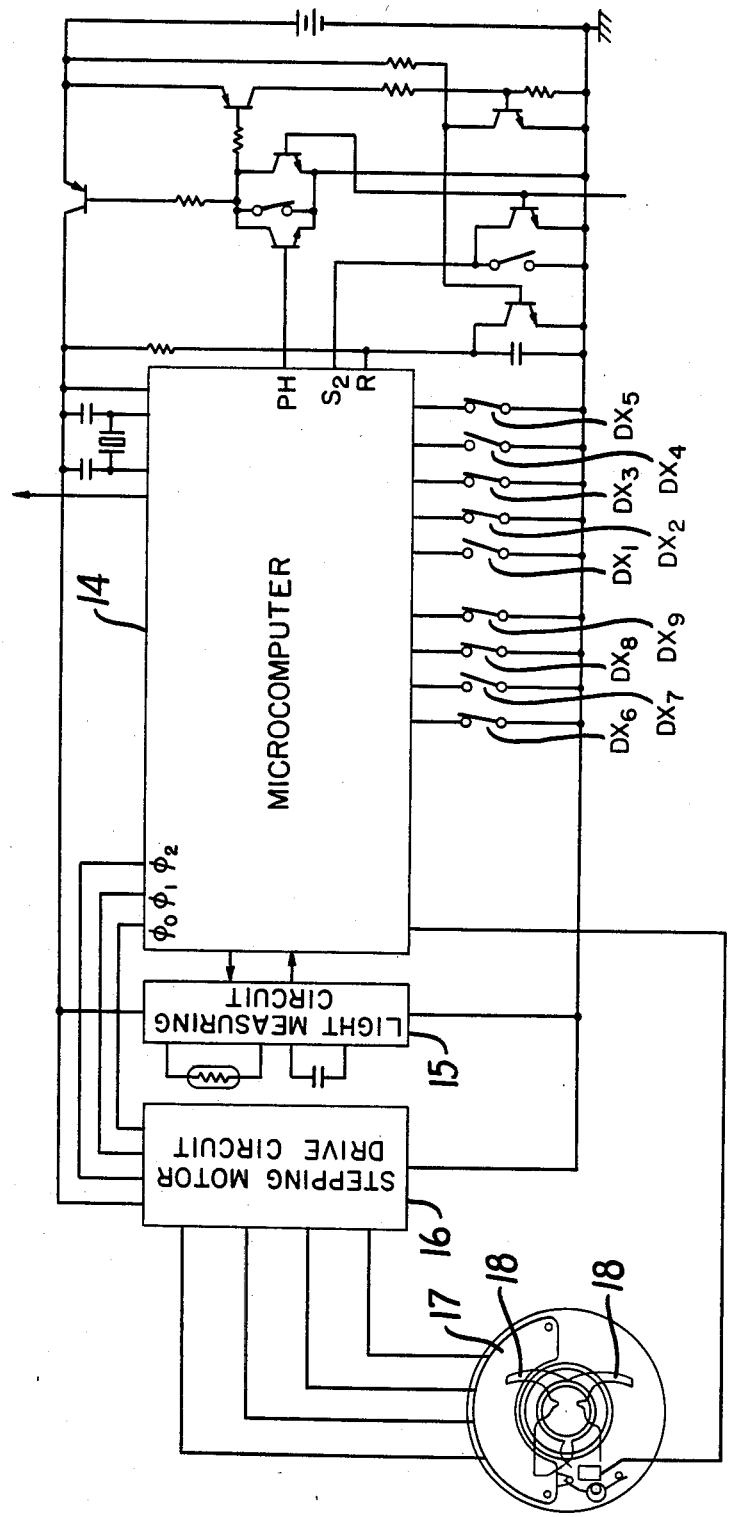
FIG. 1 is a block diagram of a device illustrating an embodiment of the present invention.

Now, the present invention will be described in detail in connection with preferred embodiments thereof illustrated in the drawings.

Figure 4:
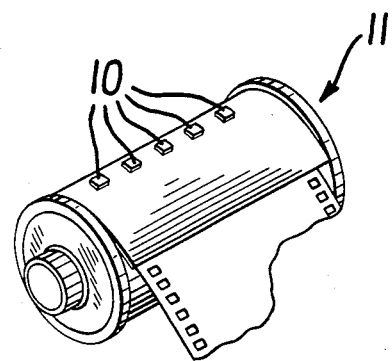
FIG. 4 is a perspective view illustrating an example of a film cartridge on which a film sensitivity code based on ISO is provided.
Figure 5:
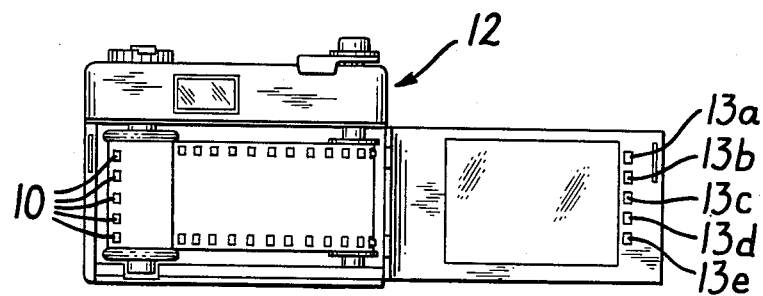
FIG. 5 is a perspective view illustrating an example of a camera which can detect film sensitivity contact elements based on ISO.

FIG. 4 illustrates an example of photograph film based on ISO which can be used for the invention, and in FIG. 4, reference numeral 10 denotes contact elements for setting a film sensitivity provided at a predetermined location of a film cartridge 11. The contact elements 10 are arranged in accordance with a code based upon ISO and represent a film sensitivity such that when the cartridge 11 is loaded into a camera body 12 (FIG. 5), they are relatively contacted with 5 contacts 13a, 13b, 13c, 13d and 13e provided on the camera body 12 to operate a contact mechanism to convert the film sensitivity into 5-bit parallel signals to be outputted therefrom.

FIG. 1 is a block diagram of a device illustrating an embodiment of the present invention, and in FIG. 1, reference numeral 14 denotes a microcomputer for controlling various operations of the camera body. The microcomputer 14 is designed to control a stepping motor 17 in response to an object luminance signal from a light measuring circuit 15 to open and close a pair of sectors 18 to attain exposure corresponding to the object luminance or brightness. Reference symbols DX1 to DX5 each designate a detecting or reading switch for reading a film sensitivity information provided on a film cartridge. The switch DX1 forms a common contact while the other switches DX2 to DX5 are switched on and off by the contact elements 10 (FIG. 4) provided on the cartridge corresponding to the sensitivity of the film. The switches are connected at one of their ends to an input bus of the microcomputer 14 via respective pull-up resistors (not shown) while the other ends thereof are grounded so that they may develop 5-bit parallel signals therefrom. Reference symbols DX6 to DX9 each denote a switch for manually setting a film sensitivity when a film cartridge has no contact elements regarding film sensitivity information provided thereon. The switches DX6 to DX9 are connected at one of their ends to the input bus of the microcomputer 14 via respective pull-up resistors (not shown) in a similar manner to the aforementioned reading switches DX1 to DX5 while the other ends thereof are grounded so that they may develop 4-bit parallel signals.

Figure 2:
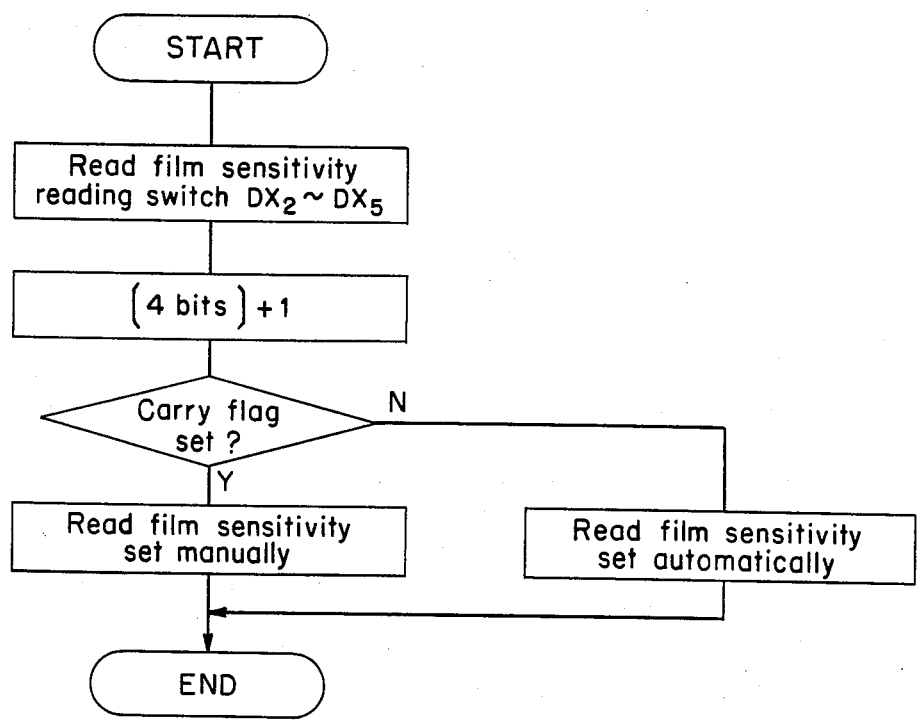
FIG. 2 is a flow chart illustrating operations of the device of FIG. 1.

The operations of the device having such a construction as described hereinafter above will be described in reference to a flow chart shown in FIG. 2.

Now, if a film cartridge containing a film sensitivity code based upon ISO is loaded into a camera body, the common contact DX1 and those contacts of the sensitivity detecting switches DX2 to DX5 which correspond to the sensitivity contact elements 10 on the cartridge are turned on while the other contacts remain in the off condition, thereby developing 5-bit parallel signals comprised of low level L signals and high level H signals. At this point in time, the microcomputer 14 reads only the 4-bit parallel signals from the sensitivity detecting switches DX2 to DX5 and at the same time adds an L signal of 1 bit to the 4-bit parallel signals. In this case, since the film loaded in the camera body has a film sensitivity based upon ISO, the 4-bit parallel signals read always include at least one bit H signal therein. Accordingly, if a 1-bit L signal is added to the parallel signals, a carry flag will not appear. Thus, the film is determined to be a film on which the sensitivity contact elements based on ISO are provided from the fact that a carry flag does not appear by addition of the 1 bit. As a result, the microcomputer 14 reads a code signal from the film sensitivity detecting switches DX2 to DX5 and sets the code signal to the camera as the film sensitivity.

On the other hand, if a film cartridge which does not contain an ISO code is loaded, the reading switches DX1 to DX5 all remain in the off condition, thereby developing 4-bit L signals. Thus, if a 1-bit L signal is added to the 4-bit L signals, a carry flag appears. From this appearance of the carry flag, the microcomputer 14 determines that a film to which no ISO code is applied is loaded, thereby signifying the setting of film sensitivity information by means of the manual switches DX6 to DX9. Then, the microcomputer 14 reads signals from the manual switches DX6 to DX9 and converts them into a code based upon ISO to change over and set the film sensitivity of the camera body.

Figure 3:
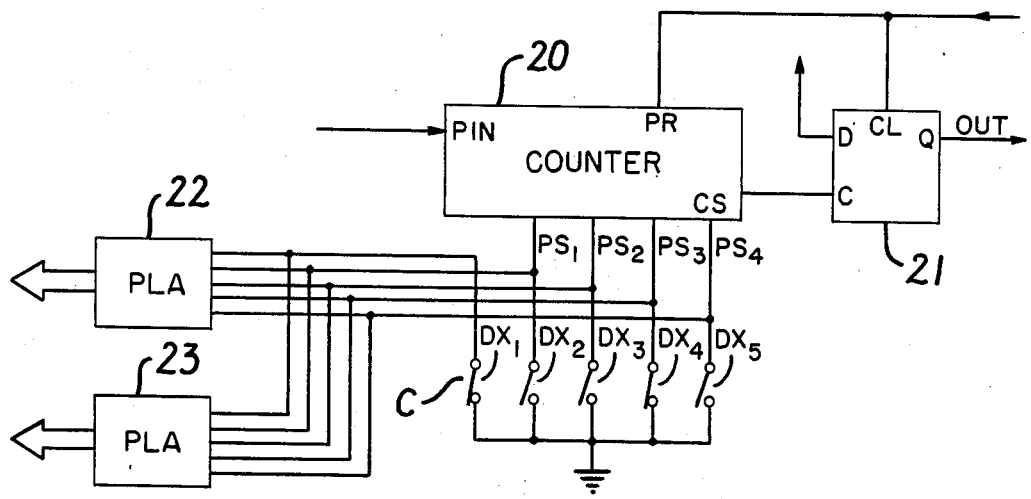
FIG. 3 is a block diagram of a device illustrating another embodiment of the invention.

FIG. 3 is a block diagram of a device illustrating a second embodiment of the invention, and in FIG. 3, reference numeral 20 designates a 4-bit presettable counter which has parallel signal input terminals PS1 to PS4, a pulse input terminal PIN, a preset input terminal PR, and a carry signal output terminal CS. Switches DX2 to DX5 for detecting a film sensitivity based on ISO are connected at one of their ends to the parallel signal input terminals PS1 to PS4 of the presettable counter 20 while the carry signal output terminal CS of the counter 20 is connected to a C terminal of a D-type flipflop 21 which will be hereinafter described. The D-type flipflop 21 has a clear terminal CL to which a preset signal is inputted, and when the ISO film sensitivity detecting switches DX2 to DX5 are all in the off condition, that is, when a film cartridge having no ISO code is loaded, the flipflop 21 develops 4-bit H signals therefrom. Reference numerals 22 and 23 each designate a programmable logic array PLA for converting an ISO code into another suitable code, for example, into a code signal suitable for apex operations, to output the same to an input bus of a microcomputer.

In the FIG. 3 embodiment, if a film cartridge having an ISO film sensitivity code provided thereon is loaded into a camera body, a preset signal is outputted from a camera body circuit (not shown) to reset the presettable counter 20 and the D-type flipflop 21. At the same time, a common terminal DX1 and those of the switches DX2 to DX5 which oppose to the sensitivity code are turned on to develop L signals while the other switches remain in the off condition to develop H signals. As a result, 4-bit parallel signals corresponding to the film sensitivity are preset to the presettable counter 20. At this point in time, a pulse is inputted to the pulse input terminal PIN of the presettable counter 20. Since the film based on ISO is naturally loaded in the camera body, no carry signal is developed from the presettable counter 20, and hence an H signal is developed from the D terminal of the D-type flipflop 21. Consequently, the film loaded is determined to be a film to which an ISO film sensitivity code is applied, and thus the code detected by the detecting switches DX2 to DX5 is converted into another code by the programmable logic array 22 to change over the read film sensitivity.

On the other hand, if a film cartridge to which no ISO film sensitivity is applied is loaded, all of the ISO code detecting switches DX2 to DX5 remain in the off condition so that 4-bit H signals are preset to the presettable counter 20. Accordingly, a pulse inputted from the pulse input terminal PIN causes a carry-over, and hence an H signal is developed from the Q terminal of the D-type flipflop 21. Consequently, the film loaded is determined to be a film to which no ISO film sensitivity which is code is applied, and the film sensitivity set by manual setting switches is read to set the film sensitivity of the camera body via the programmable logic array 23.

As apparent from the foregoing description, according to the present invention, 1 bit is added to a film sensitivity code based on ISO, and it is determined if a carry-over signal appears or not due to such addition of 1 bit. Accordingly, with a simplified circuit construction, it can be automatically determined whether or not a film is one based on ISO only by loading a film cartridge into a camera body, thereby preventing an exposure error arising from setting of a sensitivity in error.

What is claimed is:

1. An automatic film sensitivity reading device for a camera of the type equipped to receive either a coded film package containing a coded film sensitivity indication or an uncoded film package containing no coded film sensitivity indication, the device comprising: reading means operative when a coded film package is loaded in the camera for reading a coded film sensitivity indication contained on the film package and producing n-bit binary data comprised of n bits having high and low logic levels representative of the coded film sensitivity indication, and operative when an uncoded film package is loaded in the camera for producing n-bit primary data comprised of n bits all having the same logic level; calculating means for adding one-bit binary data having the same logic level as that of the n-bit binary data corresponding to an uncoded film package to the n-bit binary data produced by the reading means; and detecting means for detecting when a carry-over is produced by the calculating means by the addition of the one-bit binary data to thereby determine that a uncoded film package has been loaded in the camera based on the detection of the carry-over.

2. An automatic film sensitivity reading device according to claim 1; wherein the reading means includes means for reading a coded film package which contains a binary-coded film sensitivity indication according to the ISO system.

3. An automatic film sensitivity reading device according to claim 2; wherein the reading means includes means for reading a coded film package which includes a set of code members arranged thereon for defining the binary-coded film sensitivity indication.

4. An automatic film sensitivity reading device according to claim 3; wherein the reading means includes a set of contacts positioned to oppose the set of code members of the loaded film package for detecting the same.

5. An automatic film sensitivity reading device according to claim 4; wherein the set of contacts comprises n number of contacts.

6. An automatic film sensitivity reading device according to claim 5; wherein the n number of contacts operates to produce n-bit binary data comprised of n bits all having the same logic level when none of the n number of contacts detects the set of the code members.

7. An automatic film sensitivity reading device according to claim 1; including converting means connected to the reading means for converting the n-bit binary data representative of the coded film sensitivity indication to a code signal suitable for apex operation.

8. An automatic film sensitivity reading device according to claim 7; wherein the converting means comprises a programmable logic array.

9. An automatic film sensitivity reading device according to claim 1; including input means for manually inputting a film sensitiviy data when an uncoded film package has been loaded in the camera.

10. An automatic film sensitivity reading device according to claim 1; wherein the calculating means comprises an n-bit counter having a carry signal output terminal.

11. An automatic film sensitivity reading device according to claim 10; wherein the detecting means comprises a D-type flip-flop connected to the carry signal output terminal.

* * * * *